March 26, 1963  H. W. VAN GELDER  3,082,502
SAFETY CHAIN HOOK
Filed Dec. 28, 1959

INVENTOR.
Harold W. Van Gelde.
BY
*Sam J. Slotsky*
ATTORNEY 3,082,502
SAFETY CHAIN HOOK
Harold W. Van Gelder, Ocheyedan, Iowa
Filed Dec. 28, 1959, Ser. No. 862,393
1 Claim. (Cl. 24—241)

My invention relates to a safety chain hook.

An object of my invention is to provide a safety chain hook which includes desirable characteristics in that a chain which is used in combination with a hook cannot escape therefrom by use of an auxiliary device which is attached to the hook.

A further object of my invention is to provide a very simple arrangement which can be manufactured at a reasonable cost and which can be easily and conveniently operated to convert the arrangement to the retaining or releasing position.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1:
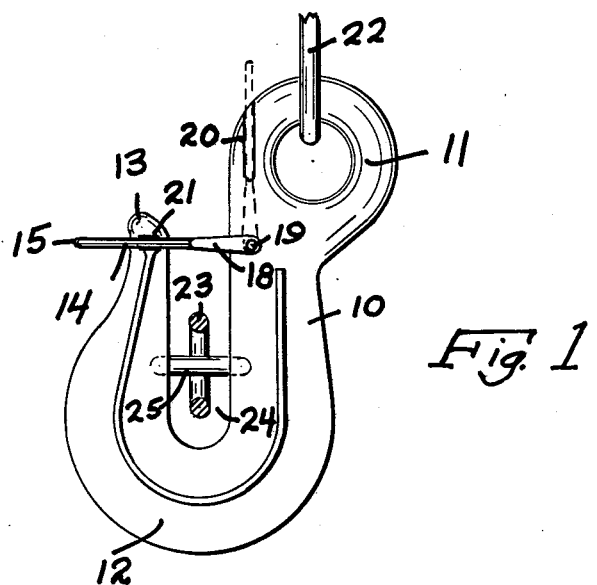
FIGURE 1 is a side elevation of the hook and attached device.

My invention contemplates the provision of a simple arrangement attached to a standard chain hook whereby the chain will not slip out of the hook, and as will be explained hereinafter.

I have used the character 10 to designate generally a chain hook with the eye portion 11, the substantially U-shaped further portion 12, and the upper portion 13.

The character 14 designates a resilient catch or retaining member looped at 15 to form yielding sides, the member 14 including the portion 16 which passes through the eye portion 11 at 17, and which then passes through the further slightly flattened portion 18, the portion 16 then being flattened out at 19 to provide a retaining means.

The character 20 indicates grooves provided in the eye portion 11, which grooves are positioned generally vertically as shown in FIGURE 1, and the character 21 indicates further grooves which are provided in the portion 13.

The device is used in the following manner. The character 22 indicates the end link of a chain which is secured to the eye portion 11, and it will be assumed that the chain will pass around any suitable object (not shown) to which the hook is to be attached, the character 23 indicating a link of this chain which passes within the opening 24 of the hook 10, the character 25 indicating the next adjacent link.

Figure 2:
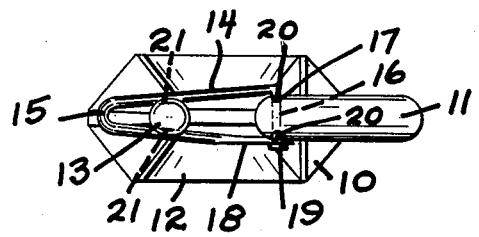
FIGURE 2 is a plan view of FIGURE 1, with the chain.

For retaining the link 24, etc., the looped member 14 is swung downwardly to the position shown in FIGURES 1 and 2 with the side portions thereof being sprung into the grooves 21 whereby the loop will be securely held.

This will therefore provide means whereby the chain portions 23, 25, etc. cannot pass out of the opening 24, and thereby the hook cannot become disengaged.

It will be noted that the member 14 is easily manipulated and can be secured in the manner stated in confined places which renders the operation easy for the operator.

When it is desired to disengage the looped member 14, it is merely swung to the vertical position shown in FIGURE 1 whereby the sides of the member 14 will be snapped into the grooves 20 and the loop will be held in open position.

It will therefore be noted that the retaining member 14 can be easily and readily swung to either position and will automatically be snapped into place in either position.

It will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

In combination with a chain hook having an eye-attaching portion, a looped resilient retaining member pivoted to said eye-attaching portion, means for locking said resilient retaining member to the free end terminal of said chain hook, said means including a portion of said end terminal having a pair of grooves positioned in said end terminal, the yielding sides of said looped resilient member being urged into the same, said chain hook having further grooves in the sides of said eye-attaching portion for locking said resilient retaining member in open position, said looped retaining member extending substantially beyond said free end terminal of said hook to provide grasping means.

References Cited in the file of this patent

UNITED STATES PATENTS

| | | |
|---|---|---|
| 222,203 | Sanford | Dec. 2, 1879 |
| 292,476 | Ferris | Jan. 29, 1884 |
| 330,437 | Spielman | Nov. 17, 1885 |
| 1,324,676 | Knudsen | Dec. 9, 1919 |
| 1,356,830 | Rohrbach | Oct. 26, 1920 |
| 1,570,865 | Soucy | Jan. 26, 1926 |
| 2,273,167 | Anderson | Feb. 17, 1942 |